United States Patent
Lipinski et al.

(10) Patent No.: US 6,536,217 B2
(45) Date of Patent: Mar. 25, 2003

(54) LIQUID FUEL REVERSE PURGE

(75) Inventors: John Lipinski, Tempe, CA (US); David K. Schott, Albuquerque, NM (US); Fredd Rodriguez, Albuquerque, NM (US); Paul Fukumoto, Westminster, CA (US)

(73) Assignee: Honeywell Power Systems Inc., Albuquerque, NM (US)

( * ) Notice: Subject to any disclaimer, the term of this patent is extended or adjusted under 35 U.S.C. 154(b) by 0 days.

(21) Appl. No.: 09/742,207

(22) Filed: Dec. 20, 2000

(65) Prior Publication Data

US 2002/0073687 A1 Jun. 20, 2002

(51) Int. Cl.$^7$ ................................ F02C 7/22
(52) U.S. Cl. .............. 60/772; 60/39.094; 417/291; 417/326
(58) Field of Search ............ 60/39.094, 772; 417/291, 326

(56) References Cited

U.S. PATENT DOCUMENTS

| | | | | |
|---|---|---|---|---|
| 2,668,782 A | * | 2/1954 | Gross ................ 134/22.1 |
| 3,485,369 A | * | 12/1969 | Voorheis ............. 210/108 |
| 3,545,418 A | * | 12/1970 | Ballou et al. ........ 123/198 DB |
| 3,901,025 A | | 8/1975 | Bryerton et al. |
| 4,206,595 A | | 6/1980 | Cole |
| 4,245,964 A | * | 1/1981 | Rannenberg ............ 60/734 |
| 4,380,146 A | | 4/1983 | Yannone et al. |
| 4,539,809 A | | 9/1985 | Stanley et al. |
| 4,598,542 A | | 7/1986 | Reynolds |
| 4,706,636 A | * | 11/1987 | Davis ................ 123/514 |
| 4,811,710 A | * | 3/1989 | Schmitt et al. ....... 123/198 DB |
| 5,095,694 A | | 3/1992 | Shekleton et al. |
| 5,299,920 A | * | 4/1994 | Stearns ............... 417/426 |
| 5,528,897 A | | 6/1996 | Halin |
| 5,701,732 A | | 12/1997 | Nesbitt et al. |
| 5,752,380 A | | 5/1998 | Bosley et al. |
| 5,809,771 A | | 9/1998 | Wernberg |
| 5,855,112 A | | 1/1999 | Bannai et al. |
| 5,873,235 A | | 2/1999 | Bosley et al. |
| 5,894,720 A | | 4/1999 | Willis et al. |
| 5,927,067 A | | 7/1999 | Hanloser et al. |
| 5,966,926 A | | 10/1999 | Shekleton et al. |
| 6,065,281 A | | 5/2000 | Shekleton et al. |
| 6,178,751 B1 | | 1/2001 | Shekleton et al. |

FOREIGN PATENT DOCUMENTS

| | | |
|---|---|---|
| EP | 0901218 | 3/1999 |
| WO | WO1-9709524 | 3/1997 |

* cited by examiner

*Primary Examiner*—Ted Kim
(74) *Attorney, Agent, or Firm*—Robert Desmond, Esq.

(57) ABSTRACT

Devices and methods for liquid fuel reverse purge on shutdown of turbines are provided. The device and method may utilize a liquid fuel reverse purge control system that includes an induction motor associated with a pump, together with fuel system solenoid valves, an electronic control unit and associated software logic. The device and method may alternative utilize a liquid fuel valve manifold including an assembly for mechanical reverse purging of liquid fuel from the atomizer fuel manifold and supply lines thereto, optionally together with an assembly for controlling the flow of the reverse-purged fuel through a re-circulation circuit used to preheat fuel prior to system start-up under cold conditions.

12 Claims, 5 Drawing Sheets

LIQUID FUEL REVERSE PURGE

BACKGROUND OF THE INVENTION

1. Field of the Invention (Technical Field)

The present invention relates to devices and methods for liquid fuel reverse purge in turbines.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

A typical gas turbine engine includes a fuel atomizer or nozzle for delivery of the fuel to the combustor, where the fuel, in combination with compressed air, is ignited. The resulting combustion gases flow through a turbine that converts combustion energy to mechanical energy capable of driving equipment, such as an electrical generator. The fuel is delivered to the fuel atomizer by means of a fuel pump. When the turbine engine is shut down for any reason, fuel remains in the lines or conduits from the fuel pump through and to the fuel atomizer.

Fuel, particularly liquid fuel, in the lines or conduits, the fuel atomizer, combustor and the like can result in gumming, coking, and similar disadvantageous results. Particularly with the fuel atomizer, this can decrease the operational life of the component thereby resulting in unscheduled removal and replacement or repair. Additionally, cold fuel within the system can interfere with the turbine start-up process, particularly since such fuel is not under pressure, is unmetered and is at a less than optimal temperature for light-off. The fuel remaining in the lines or conduits, the fuel atomizer and the like is essentially lost, and is not effectively used for turbine operation.

U.S. Pat. No. 4,206,595, entitled Fuel Collecting and Recycling System, to Cole, issued Jun. 10, 1980, discloses a recycling fuel system, including a pressure sensitive switch system, including a reservoir within the valve assembly, such that on shutdown fuel is drawn into the valve, and during operation on start-up fuel from the reservoir within the valve assembly is sequenced to the engine.

U.S. Pat. No. 4,539,809, entitled Fuel Pump Vent Drain System, to Stanley and Henry, issued Sep. 10, 1985, discloses a drain line connected to a vent valve, with a check valve and restricted flow orifice. Similarly, U.S. Pat. No. 5,095,694, entitled Fuel Purging System for a Turbine Engine, to Shekleton and Johanson, issued Mar. 17, 1992, discloses a purge system for the fuel injection system of a turbine engine whereby valves connect a purge line to an outlet port, and fuel remaining in the injector is drained into the exhaust conduit. Neither discloses use of the fuel in subsequent operation of the turbine.

U.S. Pat. No. 5,528,897, entitled Fuel Supply System for a Gas Turbine, to Halin, issued Jun. 25, 1996, discloses a fuel supply system for a gas turbine engine that incorporates a discharge conduit which is opened upon an increase in the temperature or pressure of the fuel in the fuel injector. The excess fuel is directed to a receiver or tank. Recovery of the excess fuel is not disclosed.

U.S. Pat. No. 5,701,732, entitled Method and Apparatus for Purging of Gas Turbine Injectors, to Nesbitt and Shoemaker, issued Dec. 30, 1997, discloses a valve and control system whereby, upon interruption of the fuel to the combustor, high pressure air is passed through an air passage to force the fuel in the reverse direction. No pump system is disclosed, and the source of high-pressure air is the compressor of the gas turbine. The system can thus be used when the power demand of the gas turbine shifts from high to low power, such that one or more injectors are shut down.

U.S. Pat. No. 5,927,067, entitled Self Cleaning Augmentor Fuel Manifold, to Hanloser and Harris, issued Jul. 27, 1999, discloses a self-purging gas turbine augmentor or afterburner fuel manifold, operated by core or combustion process gas.

U.S. Pat. No. 5,966,926, entitled Liquid Fuel Injector Purge System, to Shekleton and Martin, issued Oct. 19, 1999, discloses a solenoid valve controlled purge line, which operates together with solenoid valves in the liquid fuel and air assist lines, to purge liquid fuel in the injector and manifold upon shut-down. This utilizes backpressure from the combustor actuated by a solenoid, or alternatively a restrictive orifice.

U.S. Pat. No. 5,809,771, entitled Aircraft Engine Fuel System, to Wernberg, issued Sep. 22, 1998, discloses an "ecology valve" connected to fuel manifolds, which serves to suction fuel from fuel manifolds upon engine shutdown, temporarily store the fuel in reservoirs in the ecology valve, and return the stored fuel to the manifold upon the next engine operating cycle. In operation, as fuel is supplied on start-up, fuel within the reservoir of the ecology valve is expelled into the fuel line, and thus into the fuel manifolds. However, this does not provide for pre-heating of the fuel.

SUMMARY OF THE INVENTION
(DISCLOSURE OF THE INVENTION)

The invention provides a liquid fuel reverse purge control system for purging a turbine fuel manifold on shutdown of a turbine, which in one embodiment includes (a) a reversible fuel pump for pressurizing fuel from a fuel supply, (b) a fuel manifold in fluidic connection with the reversible fuel pump, (c) at least one solenoid-controlled shutoff valve located in fluidic connection between the reversible fuel pump and the fuel manifold, and (d) an electronic control unit and associated software logic, which electronic control unit is in electronic contact with the reversible fuel pump and the at least one solenoid-controlled shutoff valve, so that on system shutdown the electronic control unit and associated software logic commands the reversible fuel pump to reverse the direction of pumping for a set period of time, and after such set period of time commands the at least one solenoid-controlled shutoff valve to close. In this system, the electronic control unit and associated software logic can command the reversible fuel pump to reverse the direction of pumping within approximately ten seconds of system shutdown, and preferably within approximately one second of system shutdown. The electronic control unit and associated software logic can command the reversible fuel pump to reverse the direction of pumping for a set period of time sufficient to reverse purge all fuel downstream from the reversible fuel pump. In one embodiment, this set period of time is sufficient to reverse purge a volume of fuel equal to at least about 0.8 cubic inches. After the solenoid-controlled shutoff valve is commanded to close, all the fuel has been purged between the solenoid-controlled shutoff valve and the fuel manifold.

The invention also provides a liquid fuel valve manifold for purging a turbine fuel manifold on shutdown of a turbine, the turbine having a fuel pump with an inlet port and an outlet port for pressurizing fuel from a fuel supply and a fuel manifold in fluidic connection with the fuel pump, which liquid fuel valve manifold includes a direct acting solenoid purge valve, having a fuel supply port and a fuel manifold port, wherein on electrical activation the valve connects the fuel support port to the fuel manifold port and on electrical deactivation the value disconnects the fuel support port from the fuel manifold port, and a reverse purge piston slidably disposed within the valve, wherein on electrical deactivation the reverse purge piston suctions fuel from the fuel manifold port. The three-way direct acting solenoid purge valve can further include a re-circulation line port, wherein on electrical deactivation the valve connects the fuel manifold port and the re-circulation line port. In such event, the manifold can also include (a) a two-way direct acting solenoid re-circulation valve, having a purge valve port and a re-circulation line port, wherein on electrical activation the valve is opened and on deactivation the valve is closed, (b) a first re-circulation line in fluidic connection with the purge valve re-circulation line port and the re-circulation valve purge valve port, and (c) a second re-circulation line in fluidic connection with the re-circulation valve re-circulation line port and the inlet port of the fuel pump. The manifold can also include a stored energy mechanism for engaging the reverse purge piston on electrical deactivation, such as a spring or compressed gas. The manifold may also include a cylinder within which the reverse purge piston is slidably disposed. In one embodiment, the reverse purge piston suction fuel volume is equal to at least about 0.8 cubic inches. The manifold may include a first heating mechanism for heating fuel in the second re-circulation line, and a second heating mechanism for heating of fuel remaining within the purge valve. The second heating mechanism may employ heat conduction from the first heating mechanism.

A primary object of the present invention is to provide an apparatus and method to extend turbine operating life, and prevent unscheduled repairs or removals, by reverse purging of the fuel system on shutdown.

Another object of the present invention is to provide an apparatus and method to remove fuel from a turbine fuel atomizer and fuel supply lines thereto on shutdown, thereby limiting coking and increasing component life.

Another object of the present invention is to provide a reverse purge control system under the command of an electronic control unit, thereby integrating reverse fuel purging into operational control of the turbine.

Another object of the present invention is to provide an apparatus and method for reverse fuel purging which employs a mechanical reverse purge mechanism and normally closed, direct acting solenoid valves, such that reverse purging of the fuel system may be effected on any shutdown, including emergency shutdowns wherein there is a loss of electrical power.

Yet another object of the present invention is to provide an apparatus and method for reverse fuel purging in which fuel that is purged is recycled into a re-circulation circuit, such that the fuel may be used during the next turbine operational cycle, and may optionally be heated prior to system start-up under cold conditions.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. In the drawings.

DETAILED DESCRIPTION OF THE INVENTION

Figure 1:
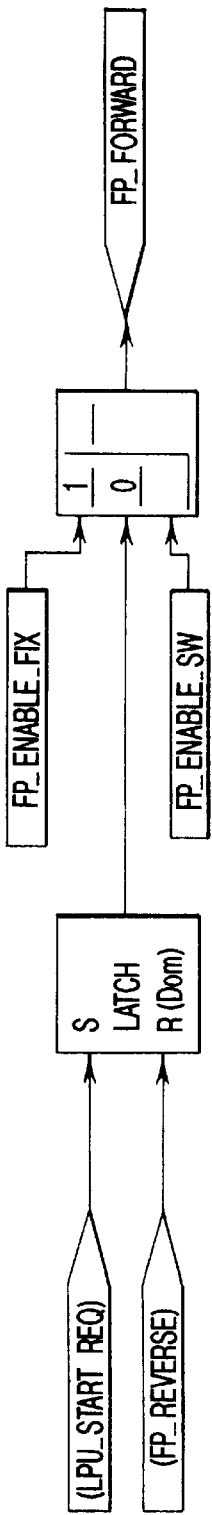
FIG. 1 is a flow chart of normal turbine operation with forward fuel flow according to an embodiment of the present invention.

The present invention comprises apparatus and methods for purging the fuel manifold, fuel atomizer and conduits thereto of fuel on turbine shutdown. The invention is useful for turbines that rely on liquid fuel, including but not limited to gas turbine fuel oil, diesel fuel oil, distillate fuel oil and aviation turbine fuel. In one embodiment, the invention comprises a liquid fuel reverse purge control system that includes an induction motor associated with a pump, together with fuel system solenoid valves, an electronic control unit and associated software logic. In operation, upon receipt of a turbine shutdown command, the system reverse purges residual fuel from the atomizer fuel manifold and supply lines thereto, all downstream of the induction motor. The lines and passages upstream of the induction motor may optionally remain fuel filled to reduce manifold filling delay time during starting. In another embodiment, the invention comprises a liquid fuel valve manifold including an assembly for mechanical reverse purging of liquid fuel from the atomizer fuel manifold and supply lines thereto, optionally together with an assembly for controlling the flow of the reverse-purged fuel through a re-circulation circuit used to preheat fuel prior to system start-up under cold conditions. In operation, upon receipt of a turbine shutdown command, the liquid fuel valve manifold removes the fuel from the atomizer and fuel lines in a direction that is opposite or reverse that of the normal operating fuel flow, and optionally controls the flow of such fuel through a re-circulation circuit.

A turbine shutdown command may be a system or user initiated command, utilizing an electronic control unit such as a system controller, and in the case of a system-initiated command, may be an emergency shutdown. Alternatively, a turbine shutdown command may be a loss of electrical power to the system, including a loss of electrical power to the liquid fuel valve manifold, such that the liquid fuel valve manifold is actuated upon such loss of electrical power, or upon loss of contact with the electronic control unit or system controller.

Liquid Fuel Reverse Pump

The assembly for the liquid fuel reverse purge control system includes an induction motor, which is reversible, associated with a pump, together with fuel system solenoid valves, an electronic control unit and associated software logic. Immediately upon receipt of a turbine shutdown command, the system causes the induction motor and pump to reverse pump, so that fuel is drawn out of the atomizer manifold in the reverse direction from normal flow. The lines and passages upstream of the induction motor remain fuel filled to reduce manifold filling delay time during starting. The fuel plumping is configured such that fuel does not drain back into the atomizer, by gravity or otherwise, after completion of the purge cycle. The purge system can withdraw at least 0.5 in$^3$, and preferably about 0.8 in$^3$, of fuel from the atomizer and fuel lines between the pump and atomizer within at least 10 seconds after shutdown, and preferably with about 2 seconds after shutdown, and most preferably within about 1 second after shutdown.

Figure 2:
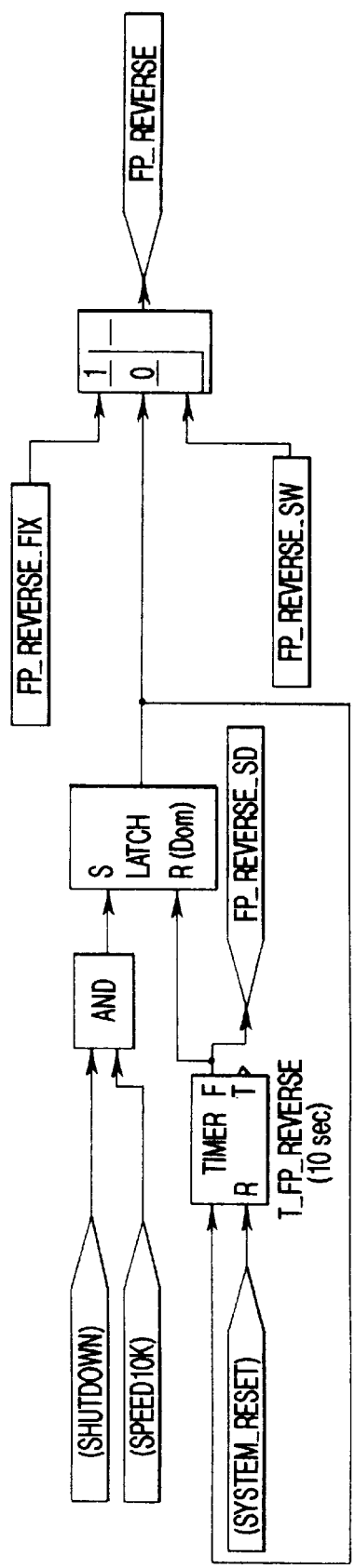
FIG. 2 is a flow chart of turbine shutdown, commanded or uncommanded, according to an embodiment of the present invention.
Figure 3:
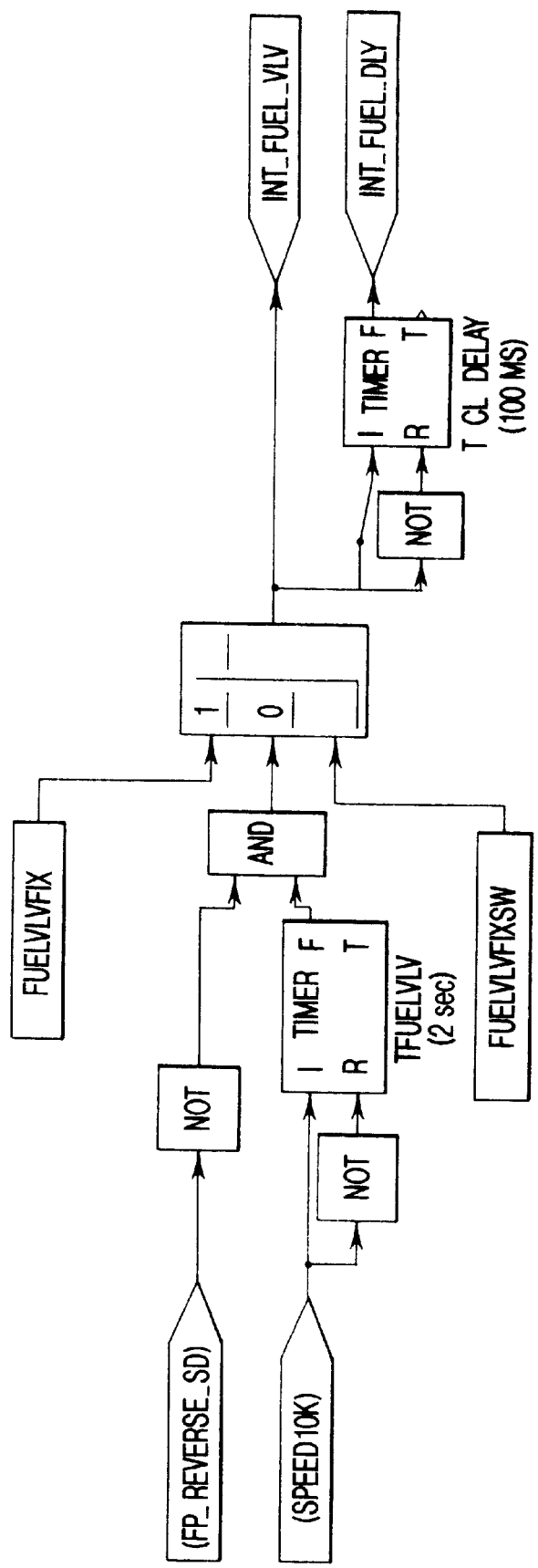
FIG. 3 is a flow chart of fuel system solenoid valve controls after purge mode according to an embodiment of the present invention.
Figure 4:
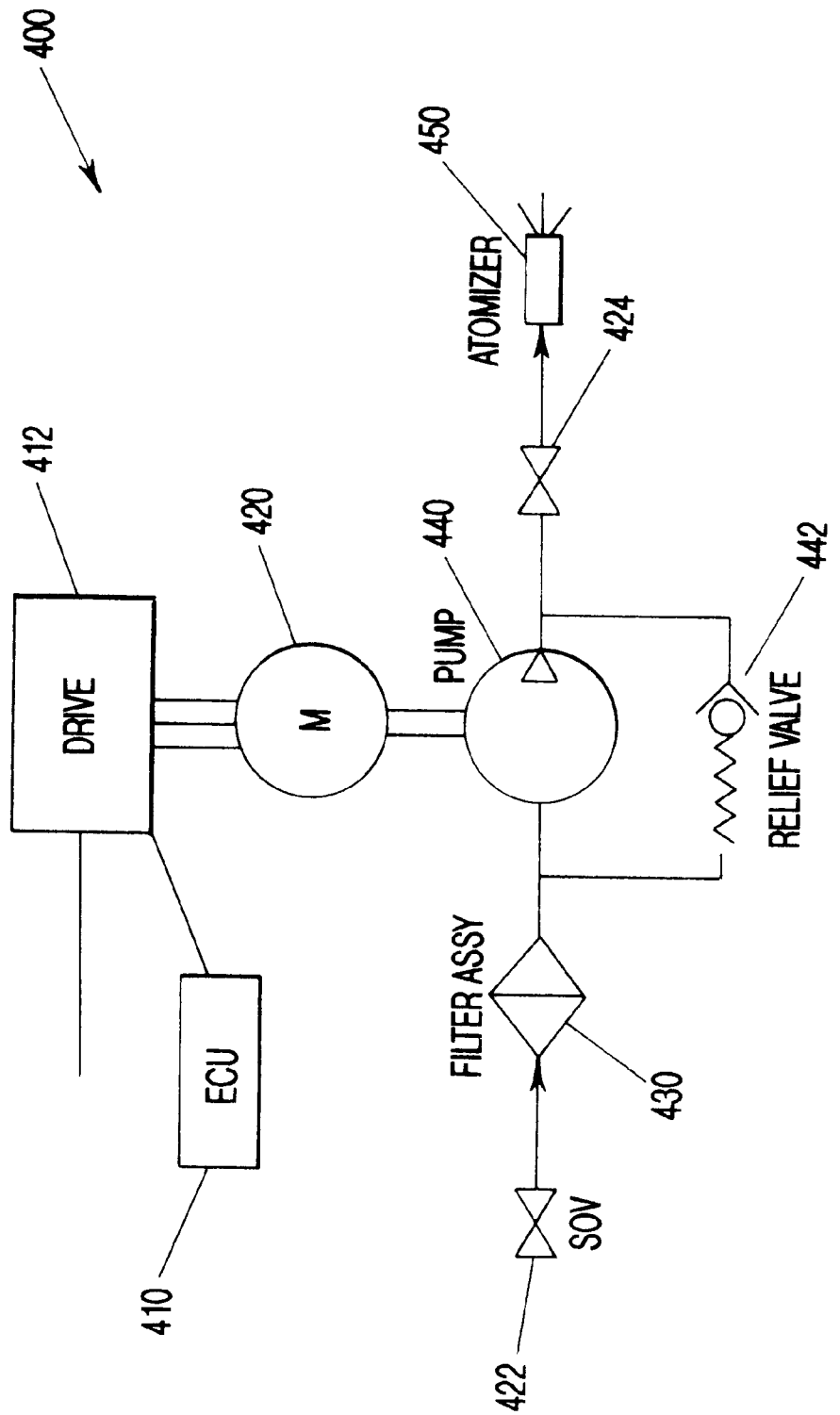
FIG. 4 is a schematic diagram of a liquid fuel reverse purge control system according to an embodiment of the present invention.

As shown in FIG. 4, the liquid fuel reverse purge system 400 comprises an electronic control unit 410 which includes associated software logic, as shown in the flow charts of FIG. 1, FIG. 2 and FIG. 3. The system 400 includes a variable speed and reversible drive 412 and induction motor 420 associated with pump 440, which pump delivers liquid fuel to the atomizer fuel manifold 450. The fuel delivery components include two solenoid-controlled shutoff valves 422 and 424, with valve 422 located prior to the pump 440 and valve 424 located between the pump and the atomizer fuel manifold 450. The fuel delivery components may include a filter assembly 430, or optionally a heater assembly or other component. The pump assembly 440 may include a relief valve 442. During normal turbine operation, with forward fuel flow, the electronic control unit 410 commands the drive 412, which controls the motor 420, to operate in the forward direction by FP_Forward logic, as described in FIG. 1. In this operation, the system 400 delivers fuel to the atomizer fuel manifold 450 to support combustion, with fuel flow rates, air intake and other operational parameters optionally under the control of unit 410. Upon a turbine shutdown, which may be commanded or uncommanded, the drive 412 is commanded by the electronic control unit 410 to operate in reverse purge mode for a set period of time, such as ten seconds, as shown in FIG. 2. After operation of the purge mode for the set period of time, the solenoid-controlled shutoff valves 422 and 424 are commanded closed, as shown in FIG. 3, thereby preventing back-pressure or gravity flow of fuel into the atomizer fuel manifold 450.

Liquid Fuel Valve Manifold

The liquid fuel system of the turbine includes a purge valve and a re-circulation valve as components of the liquid fuel valve manifold, and can further include a self-contained pump module assembly and a control module. The pump module assembly contains the components required for the filtration and heating of the fuel, pressurization and metering of the fuel, and compressed air required for atomization of the fuel during the start of the turbine. The control module includes the electrical components specific to the liquid fuel system. The control module can further include a variable frequency drive controller that provides the speed control for the metering pump.

The purge valve component can be separate from the pump module assembly can be located in close proximity to the combustor. The purge valve is in series with the fuel line between the fuel pump and the combustor, including the fuel nozzle. The purge valve purges the fuel nozzle and fuel line downstream of the valve itself upon any shutdown, normal or protective. The valve then optionally discharges at least a portion of fuel to a return port. The return port may be plumbed into a re-circulation circuit that is used for the pre-heating of fuel prior to cold starts. The remaining portion of purged fuel, if any, may be retained in the cavity of the purge valve. This portion of the fuel does not get heated prior to a cold start.

The re-circulation valve component, like the purge valve, is not part of the pump module assembly and it is located in the same vicinity as the purge valve, preferably forming a part of the same manifold. The re-circulation valve works in conjunction with the fuel pump and the fuel heater to provide for heating of the fuel prior to cold starts. The heating function occurs for temperature lower than 30° F. The re-circulation valve functions to open and close the "re-circulation" circuit to allow the fuel to be re-circulated for a required amount of time until its temperature and viscosity are at a suitable state for fuel nozzle operability.

The liquid fuel valve manifold assembly for mechanical reverse purging of liquid fuel from the atomizer fuel manifold and supply lines thereto includes a three-way, two-position, solenoid-operated valve with a mechanically actuated return, such as a spring-loaded return, to the de-energized position. The valve performs at least two functions; it provides a positive shutoff of fuel flow to the fuel atomizer when de-energized, and mechanically reverse purges the fuel from the fuel atomizer and fuel lines downstream of the liquid fuel valve manifold when de-energized. The value further includes a reverse purge piston slidably disposed within the valve, preferably within a cylinder, such that on electrical deactivation the reverse purge piston suctions fuel from the fuel manifold port. In a third function, in the de-energized position the valve directs the purged fuel to a return port. The return port may be connected to a re-circulation circuit for pre-heating of the fuel for cold starts. The liquid fuel valve manifold can also include an assembly for controlling the flow of the reverse-purged fuel through the re-circulation circuit. This assembly can comprise a two-way, two-position, solenoid-operated valve, to open or close the re-circulation circuit as directed by a signal from the electronic control unit or system controller. The liquid fuel valve manifold may include a single solenoid, which single solenoid controls both the three-way, two-position, solenoid-operated purge valve and the two-way, two-position, recirculation valve.

The liquid fuel valve manifold may be configured such that the portion of purged fuel that remains in the purge valve cavity is pre-heated prior to a cold start. In one embodiment, heat conduction from the re-circulation circuit is utilized to heat the fuel stored in the purge valve cavity.

The liquid fuel valve manifold may be connected to the pump unit and the fuel atomizer by means of tubing of suitable diameter, such as one-quarter inch outside diameter tubing. The total purge volume includes both the volume of fuel purged from the fuel atomizer and the volume of fuel purged from the line or tubing between the fuel atomizer and the purge valve. In one embodiment, the total purge volume is approximately 0.8 in$^3$. The purge action must be activated as soon as the power is removed from the purge valve solenoid under any operating condition.

Figure 5:
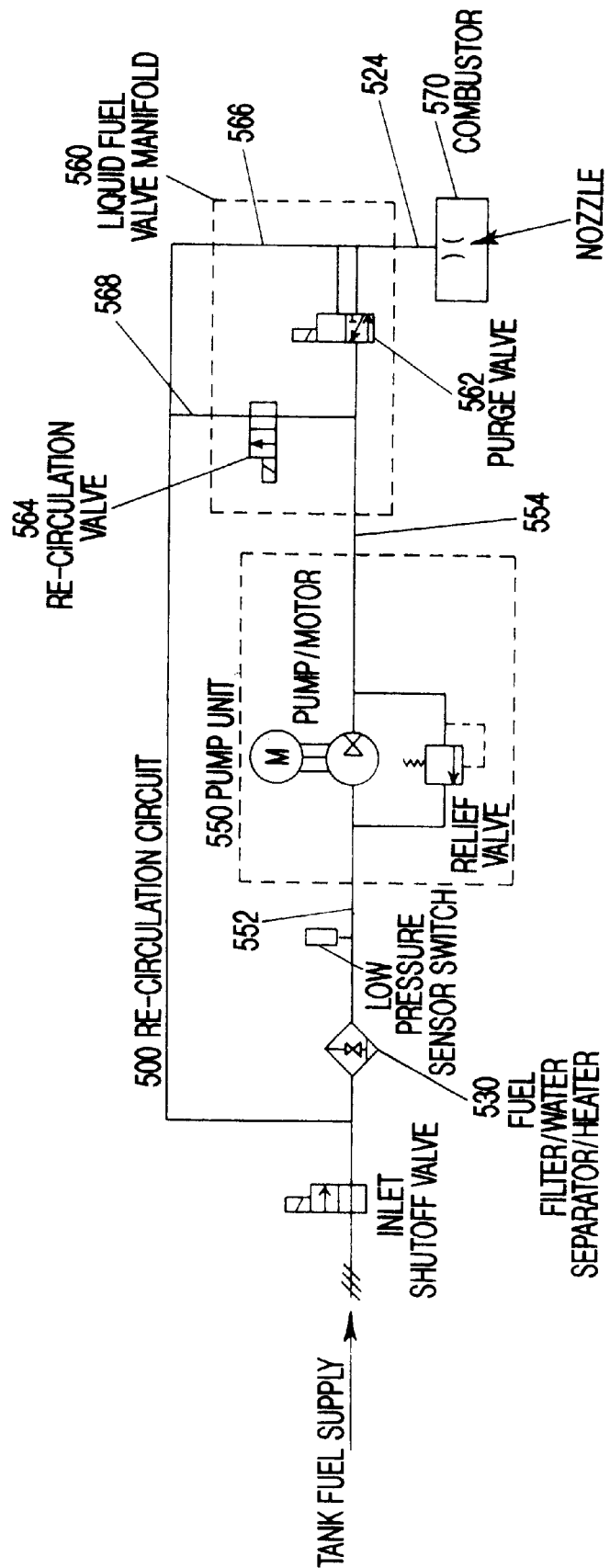
FIG. 5 is a schematic diagram of a liquid fuel valve manifold according to an embodiment of the present invention.

In operation, the three-way, two-position, solenoid-operated purge valve for mechanical reverse purging of liquid fuel is normally closed, and is opened only on initiation of start-up, upon receipt of an appropriate electrical signal from an electronic control unit such as a system controller. As shown in FIG. 5, the liquid fuel valve manifold 560 comprises a purge valve 562 that is connect by tubing 554 on the inlet side to the pump unit 550, and is connected to the combustor 570 by means of tubing 524, and is connected to a re-circulation circuit 500 by means of tubing 566. When the purge valve 562 is de-energized, no fuel may be returned to the combustor 570. The purge valve 562 includes a mechanical reverse purge mechanism, which may be spring actuated, pressure actuated or actuated by a hydraulic mechanism, which reverses the flow of fuel to the combustor 570 on de-energization of the purge valve 562. The mechanical reverse purge mechanism may further include a piston and cylinder for reverse purge suctioning of the fuel from combustor 570 and tubing 524 connected thereto. Fuel from combustor 570 and tubing 524 connected thereto is, by reverse flow, caused to flow to the purge valve 562. Such fuel may be retained in the purge valve 562, or may be routed to the re-circulation circuit 500 by means of tubing 566. A re-circulation valve 564, optionally forming a part of liquid fuel valve manifold 560, prevents return flow of fuel through tubing 568 to the purge valve 562 in advance of the pump unit 550. The re-circulation fuel, obtained on reverse purging, thus enters line 552 in advance of heater 530, and such fuel may then be heated to the optimal temperature for use on start-up. Fuel remaining in the purge valve 562 may similarly be heated to the optimal temperature for use on start-up, such as heat conduction from the re-circulation circuit.

Figure 6:
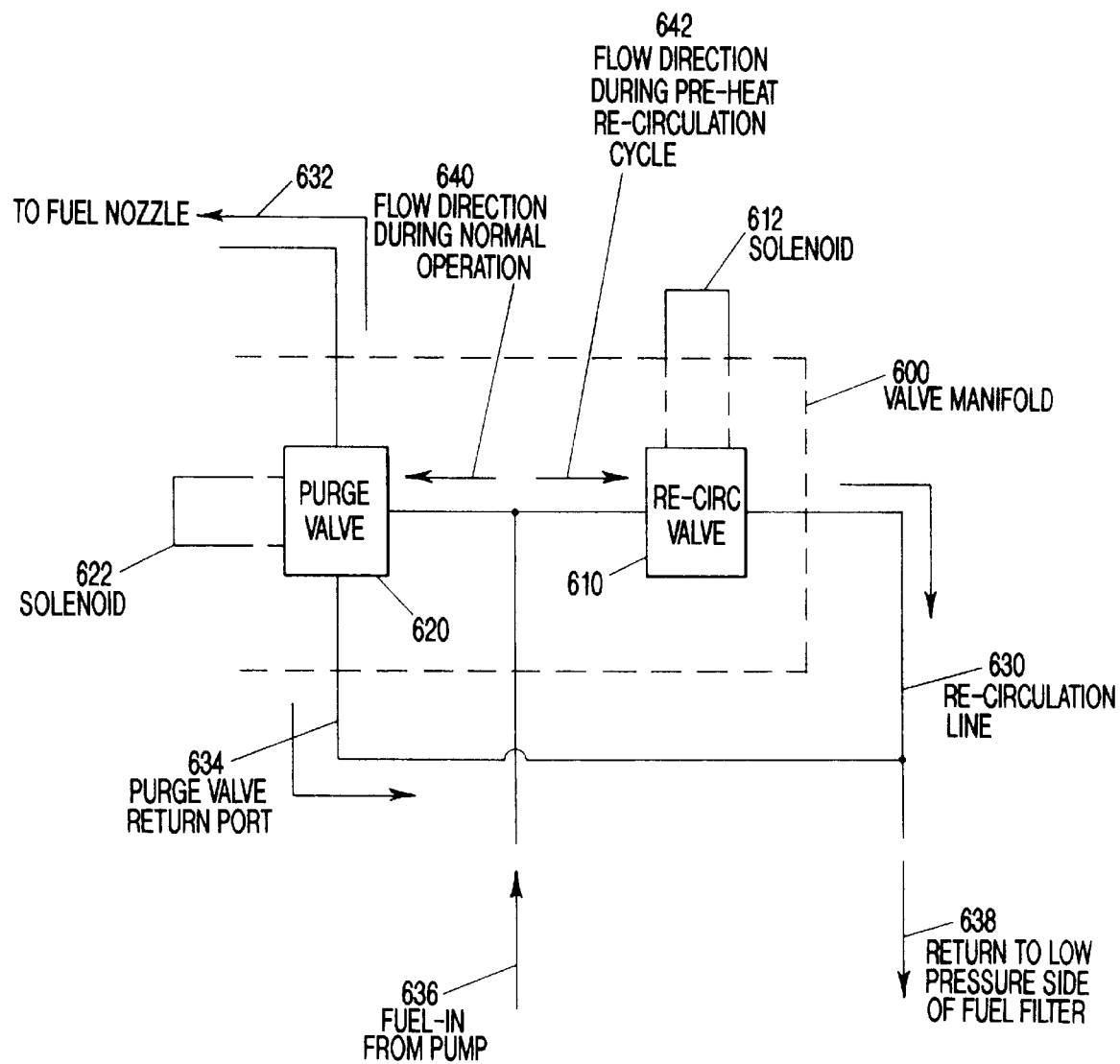
FIG. 6 is a schematic of the purge valve and re-circulation valve components of the liquid fuel valve manifold according to an embodiment of the present invention.

The liquid fuel valve manifold 600 is depicted in greater detail in FIG. 6, which further depicts the fuel flow direction 640 during normal operation, and the fuel flow direction 642 during the pre-heat re-circulation cycle. The purge valve 620 includes a solenoid 622, and the re-circulation valve 610 includes a solenoid 612. In an alternative configuration, both valve components may employ the same single solenoid. Fuel from the pump enters in the direction 636, and in normal operation exits to the fuel nozzle in direction 632. When the purge valve 620 is de-energized, the solenoid 622 engages the purge valve return port, and directions the fuel in direction 634. Fuel then flows through the re-circulation line 630, with a return line 638 to the low-pressure side of the fuel filter. The purge valve 620 includes a mechanical reverse purge mechanism, which may be spring actuated, pressure actuated or actuated by a hydraulic mechanism, which reverses the flow of fuel to the fuel nozzle 632 on de-energization. The mechanical reverse purge mechanism further includes a piston and cylinder for reverse purge suctioning of the fuel from fuel nozzle 632 and lines connected thereto. Fuel retained in the purge valve 620 can be heated, so that in the event of a cold start fuel of appropriate temperature is delivered to the fuel nozzle.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A liquid fuel reverse purge control system for purging a turbine fuel manifold on shutdown of a turbine, the system comprising:
   a reversible fuel pump for pressurizing fuel from a fuel supply;
   a fuel manifold in fluidic connection with the reversible fuel pump;
   at least one solenoid-controlled shutoff valve located in fluidic connection between the reversible fuel pump and the fuel manifold; and
   an electronic control unit and associated software logic, which electronic control unit is in electronic contact with the reversible fuel pump and the at least one solenoid-controlled shutoff valve, so that on system shutdown the electronic control unit and associated software logic commands the reversible fuel pump to reverse the direction of pumping for a set period of time to purge residual fuel from the fuel manifold, and after such set period of time commands the at least one solenoid-controlled shutoff valve to close.

2. The system of claim 1 wherein the electronic control unit and associated software logic commands the reversible fuel pump to reverse the direction of pumping within approximately ten seconds of system shutdown.

3. The system of claim 2 wherein the electronic control unit and associated software logic commands the reversible fuel pump to reverse the direction of pumping within approximately one second of system shutdown.

4. The system of claim 1 wherein the electronic control unit and associated software logic commands the reversible fuel pump to reverse the direction of pumping for a set period of time sufficient to reverse purge all fuel downstream from the reversible fuel pump.

5. The system of claim 1 wherein the electronic control unit and associated software logic commands the reversible fuel pump to reverse the direction of pumping for a set period of time sufficient to reverse purge a volume of fuel equal to at least about 0.8 cubic inches.

6. The system of claim 1, wherein after the at least one solenoid-controlled shutoff valve is commanded to close all fuel has been purged between the at least one solenoid-controlled shutoff valve and the fuel manifold.

7. The system of claim 1, wherein the fuel manifold further comprises an atomizer.

8. A method for purging a turbine fuel manifold on shutdown of a turbine, the system comprising a reversible fuel pump for pressurizing fuel from a fuel supply, a fuel manifold in fluidic connection with the reversible fuel pump, at least one solenoid-controlled shutoff valve located in fluidic connection between the reversible fuel pump and the fuel manifold, and an electronic control unit and associated software logic, which electronic control unit is in electronic contact with the reversible fuel pump and the at least one solenoid-controlled shutoff valve, comprising:
   commanding the reversible fuel pump to reverse the direction of pumping for a set period of time to purge residual fuel from the fuel manifold; and
   after the set period of time, commanding the at least one solenoid-controlled shutoff valve to close.

9. The method according to claim 8, wherein said set period of time is sufficient to reverse purge all fuel downstream from the reversible fuel pump.

10. The method according to claim 8, wherein said reverse pumping occurs within about 10 seconds of system shutdown.

11. The method according to claim 10, wherein said reverse pumping occurs within about 1 second of system shutdown.

12. A liquid fuel reverse purge control system for purging a turbine fuel manifold on shutdown of a turbine, the system comprising:
   a reversible fuel pump for pressurizing fuel from a fuel supply;
   an atomizer fuel manifold in fluidic connection with the reversible fuel pump, said atomizer fuel manifold delivering fuel to said turbine during normal operation;
   at least one solenoid-controlled shutoff valve located in fluidic connection between the reversible fuel pump and the fuel manifold; and an electronic control unit and associated software logic, which electronic control unit is in electronic contact with the reversible fuel pump and the at least one solenoid-controlled shutoff valve, so that within ten seconds of system shutdown the electronic control unit and associated software logic commands the reversible fuel pump to reverse the direction of pumping for a set period of time to purge residual fuel from the fuel manifold, and after such set period of time commands the at least one solenoid-controlled shutoff valve to close.

* * * * *